United States Patent [19]

Evans

[11] 3,836,288

[45] Sept. 17, 1974

[54] BLOWER CONTROL ASSEMBLY FOR VACUUM CONVEYOR SYSTEM

[75] Inventor: Arthur J. Evans, Northville, Mich.

[73] Assignee: Whitlock, Inc., Framington, Mass.

[22] Filed: May 17, 1973

[21] Appl. No.: 361,233

[52] U.S. Cl................. 417/307, 417/440, 417/442, 243/2, 302/27, 302/28
[51] Int. Cl....................... B65g 51/34, B65g 53/28
[58] Field of Search.......... 243/2; 302/1, 21, 27, 28; 417/315, 442, 485, 307, 440

Primary Examiner—James B. Marbert
Assistant Examiner—W. Scott Carson
Attorney, Agent, or Firm—Kinzer, Plyer, Dorn & McEachran

[57] ABSTRACT

A control assembly for the blower of a vacuum conveyor system, comprising a three-way fluid-pressure-actuated blower inlet valve connecting the blower inlet either to the conveyor system or to exhaust, a similar blower outlet valve connecting the blower outlet either to the conveyor system or to exhaust, and actuating means for actuating the valves, in coordination, to (A) a conveyor vacuum mode of operation with the blower inlet valve open to the conveyor system and the outlet valve open to exhaust, to (B) a conveyor pressure mode with the inlet valve open to exhaust and the outlet valve open to the conveyor system, and to (C) a conveyor idling mode, with both valves open to exhaust.

12 Claims, 5 Drawing Figures

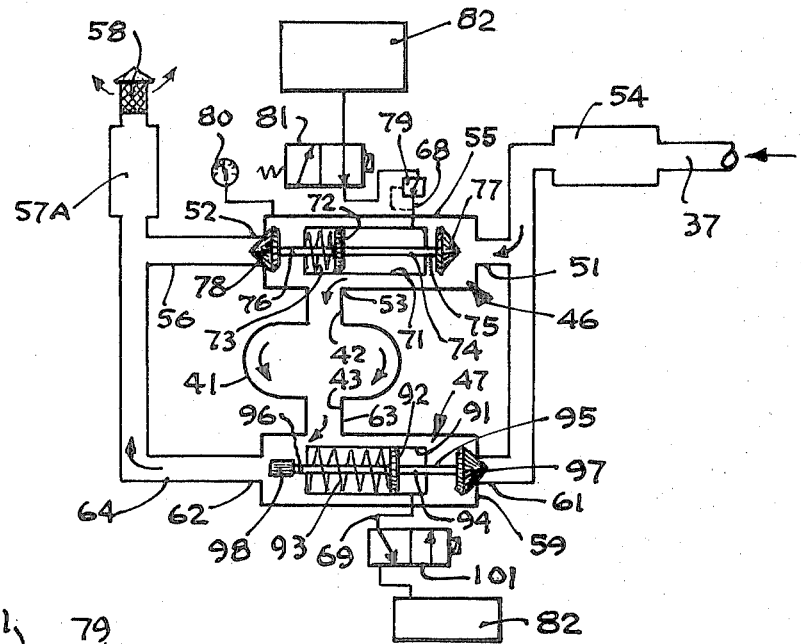
FIG.3 VACUUM MODE
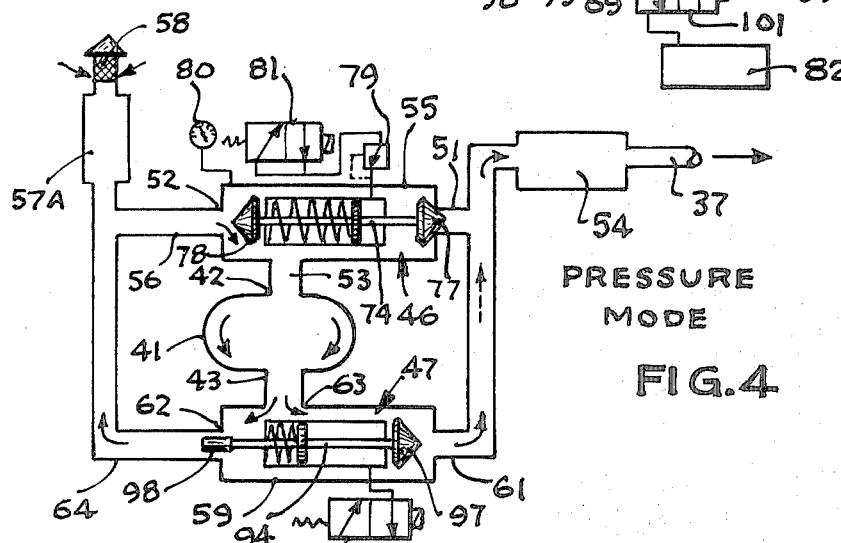
FIG.4 PRESSURE MODE
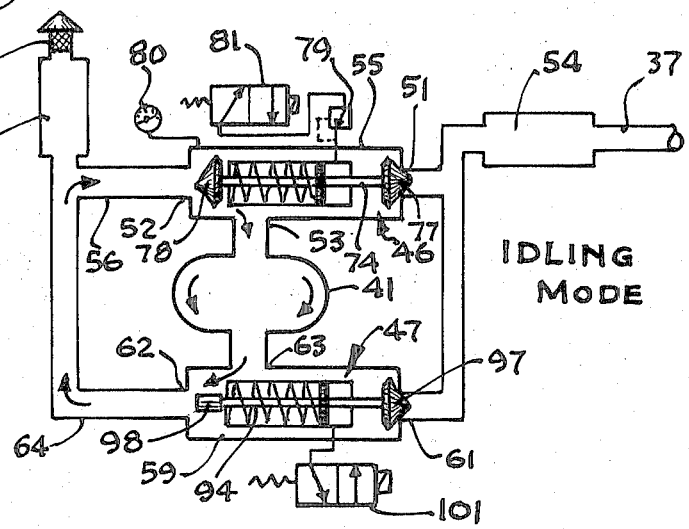
FIG.5 IDLING MODE

BLOWER CONTROL ASSEMBLY FOR VACUUM CONVEYOR SYSTEM

BACKGROUND OF THE INVENTION

Vacuum and other pneumatic conveyor systems are commonly used to transport a wide variety of free-flowing materials. For example, conveyor systems of this kind are utilized to feed granular, pelletized and powdered plastic materials from supply bins to molding machines in plastic molding plants. Conveyor systems of this general nature are also utilized in unloading free-flowing plastic materials, grain, and other similar materials from rail cars to storage silos and vice versa.

Many such conveyor systems require operation in two different modes, in one of which a conveyor system conduit is placed under a substantial vacuum whereas in the other the same conduit is filled with air under considerable pressure. The term "vacuum conveyor system", as used in this specification and in the appended claims, is intended to include any vacuum or pneumatic conveyor system requiring both modes of operation.

In a vacuum conveyor system, it is common practice to use a single blower to provide the requisite operating conditions for both the vacuum mode and the pressure mode of operation. A reversible rotary blower is usually employed; the blower is rotated in one direction to draw air from the conveyor system conduit and thus create a vacuum, and is rotated in the opposite direction to force air under pressure into the conduit. In these conventional systems, some delay is inherently required for transition between the vacuum and pressure modes of operation, since the blower must be stopped and then started to rotate in the opposite direction each time a change of mode occurs. Of course, a reversible blower must be provided and a reversible drive for the motor is also required, increasing the cost of the system in comparison with a unidirectional blower and drive. Furthermore, if changes in operational mode occur relatively frequently, this kind of operation imposes rather severe demands on the blower and blower drive, creating a potential maintenance expense.

It has been proposed that a single unidirectional blower be utilized in vacuum conveyor systems. However, the valves and valve controls suggested for an arrangement of this kind tend to be relatively complex and expensive. Available valve structures are often unreliable, tending to clog rather frequently from accumulation of powder or granular material. Moreover, in the event of failure of the valves in a closed circuit arrangement, so that the blower is not connected to exhaust, there is a substantial possibility of overheating and consequent damage to the blower and sometimes to the blower drive.

SUMMARY OF THE INVENTION

It is a primary object of the present invention, therefore, to provide a new and improved blower control assembly for the blower of a vacuum conveyor system that affords both vacuum and pressure modes of operation for the conveyor system without requiring reversal of the blower.

Another object of the invention is to provide a new and improved blower control assembly for a unidirectional blower utilized to afford both vacuum and pressure modes of operation in a vacuum conveyor system, which inherently and automatically connects both the inlet and outlet of the blower to exhaust in the event of failure of any of the principal controls, precluding damage to the blower.

Another object of the invention is to provide a new and improved blower control assembly for a unidirectional blower in a vacuum conveyor system, affording both vacuum and pressure modes of operation for the system, that incorporates inlet and outlet valves for the blower which are inherently self-clearing and can maintain the blower in effective maintenance-free operation over long periods of time.

A particular object of the invention is to provide a new and improved blower control assembly for a unidirectional blower in a vacuum conveyor system that is simple and inexpensive in construction yet highly reliable in operation.

Accordingly, the invention relates to a blower control assembly for the blower of a vacuum conveyor system, providing both vacuum and pressure operation of the conveyor system without reversal of the blower. The blower control assembly comprises a blower inlet valve having first, second, and third ports respectively connected to the conveyor system, to an exhaust conduit, and to the blower inlet, and a blower outlet valve having first, second, and third ports respectively connected to the conveyor system, to an exhaust conduit, and to the blower outlet. Each of the blower inlet and outlet valves is actuatable between a first operating condition, in which the second valve port is connected to the third valve port with the first valve port closed, and a second operating condition in which the third valve port is connected to the first valve port with the second valve port closed. The blower control assembly further comprises actuating means, connected to the blower inlet and outlet valves, for selectively actuating the valves to establish the conveyor system in each of the following modes of operation:

A. a conveyor vacuum mode, with the blower inlet valve in its second operating condition and the blower outlet valve in its first operating condition;

B. a conveyor pressure mode, with the blower inlet valve in its first operating condition and the blower outlet valve in its second operating condition; and C. a conveyor idling mode, with each blower valve in its first operating condition.

BRIEF DESCRIPTION OF THE DRAWINGS

FIG. 3 is a schematic sectional elevation view of the blower control assembly of FIG. 2, with the control assembly in a vacuum mode of operation;

FIG. 4 is a schematic view, similar to FIG. 3, showing the blower control assembly in a pressure mode of operation; and FIG. 5 is a schematic illustration, similar to FIGS. 3 and 4, showing the blower control assembly in an idling mode of operation.

DESCRIPTION OF THE PREFERRED EMBODIMENT

Figure 1:
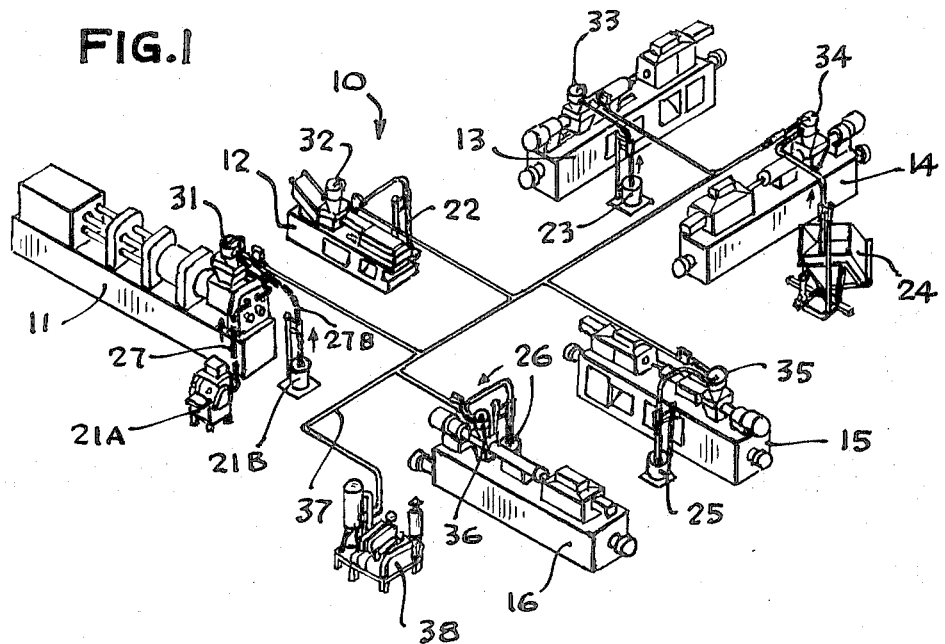
FIG. 1 is a schematic representation of one form of vacuum conveyor system in which the blower control assembly of the present invention can be incorporated.

FIG. 1 illustrates a vacuum conveyor system 10 of a kind commonly utilized in plastic molding plants to supply free-flowing pelletized, granular, or powdered plastic materials to molding machines. The vacuum conveyor system 10 serves a plurality of individual molding machines 11, 12, 13, 14, 15 and 16 which, as illustrated, may be of diverse types and sizes. Thus, molding machine 11 requires two input materials, one material being taken from a grinder 21A and the second material being supplied from a storage bin 21B. Grinder 21A and bin 21B are connected, by individual material conduits 27A and 27B respectively, to a vacuum hopper 31 at the input of molding machine 11. Individual material valves may be incorporated in conduits 27A and 27B.

The second molding machine 12 utilizes a similar supply arrangement, with material being conveyed from a single storage bin 22 to a vacuum hopper 32 on the molding machine. Separate storage bins or containers 23, 24, 25 and 26 are provided for molding machines 13, 14, 15 and 16, respectively. The vacuum hoppers for molding machines 13, 14, 15 and 16 are indicated by reference numerals 33, 34, 35 and 36.

To transfer the free-flowing pelletized, granular, or powdered plastic material from grinder 21A to the input hopper of molding machine 11, a substantial vacuum is developed in vacuum hopper 31 and the valve for material conduit 27A is opened, drawing plastic material from grinder 21A into vacuum hopper 31. Similarly, material is transferred into hopper 31 from bin 21B by developing a vacuum in the hopper and opening the material conduit 27B to withdraw material from the supply bin. A similar procedure is used for each of the other molding machines 12–16, utilizing their vacuum hoppers 32–36 and supply sources 22–26. To develop the requisite vacuum within each of the hoppers 31–36, all of the hoppers are connected to a vacuum line 37 which is connected to a vacuum power unit 38. The blower control assembly of the present invention is a part of power unit 38, as described more fully hereinafter.

In the operation of the vacuum conveyor system 10, whenever it is desired to feed material from the supply sources to the molding machines, a substantial vacuum is developed in the vacuum conduit 37. For this vacuum mode of operation of the conveyor system, conduit 37 is exhausted by means of a blower incorporated in power unit 38. In a given system, the vacuum in conduit 37 may be maintained for a period of the order of one minute or more. After all of the vacuum hoppers 31–36 have been filled, it is desirable to carry out a blowback operation, so that any of the plastic that may have entered vacuum line 37 and its extensions is returned to the individual vacuum hoppers and also so that the vacuum hoppers are placed under pressure for the feeding of the plastic material into the individual molding machines.

In a conventional vacuum conveyor system, this pressure or blowback mode of operation is usually effected by reversing the direction of rotation of the blower in power unit 38 to force air under pressure into vacuum conduit 37 and hence into the individual vacuum hoppers 31–36. The pressure or blowback mode of operation may also be maintained for periods of the order of one minute or more, following which the system may again be actuated to the vacuum mode of operation described above. When power unit 38 incorporates a blower control assembly constructed in accordance with the present invention, however, the transition between the vacuum mode of operation and the pressure mode of operation for system 10 is accomplished with the blower in the power unit operating continuously in one direction; no reversal of the blower is required.

Figure 2:
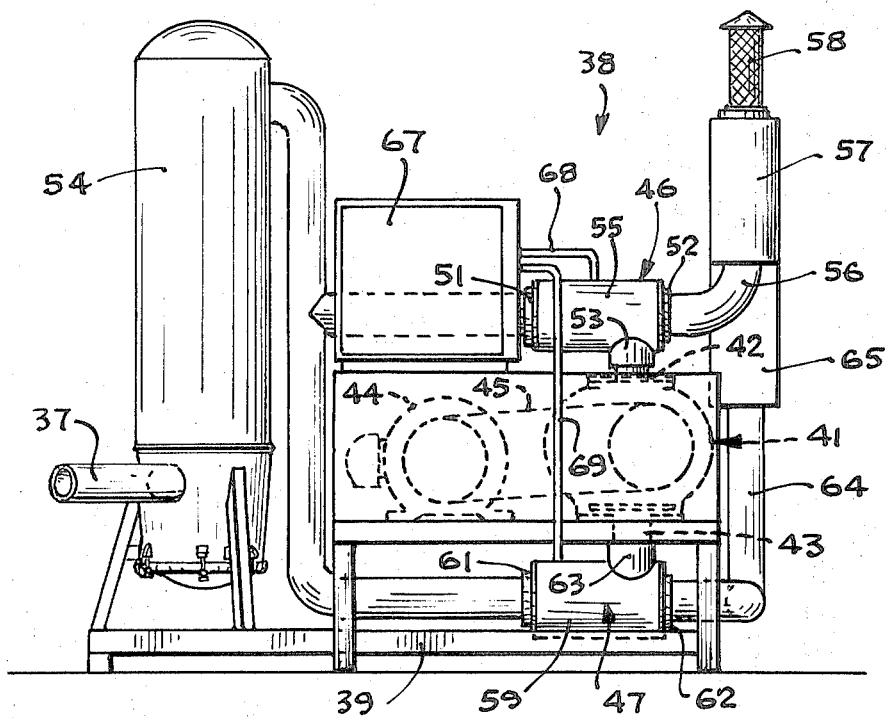
FIG. 2 is a side elevation view of a blower control assembly for a vacuum conveyor system constructed in accordance with one embodiment of the present invention.

FIG. 2 illustrates a vacuum power unit 38 for conveyor system 10 (FIG. 1) constructed in accordance with one embodiment of the present invention. Power unit 38, as shown in FIG. 2, comprises a frame 39 supporting a rotary blower 41 having an inlet 42 and an outlet 43. A blower drive motor 44 is also mounted on frame 39 and a driving connection to blower 41 is provided by suitable means such as a plurality of belts 45. Motor 44 is a single-direction motor which drives blower 41 for rotation in only one direction.

The vacuum power unit 38 incorporates a control assembly for blower 41 that includes a blower inlet valve 46 and a blower outlet valve 47. The blower inlet valve 46 has a first port 51 that is connected to the conveyor system 10, and specifically to the conduit 37, through a filter 54 which, in this instance, is a part of power unit 38 and is mounted upon frame 39. The blower inlet valve 46 has a second port 52 that is axially aligned with port 51 at the opposite end of the valve housing 55. This second port 52 is connected to an exhaust conduit 56 that is vented to the atmosphere through a muffler 57 and an exhaust screen 58. The blower inlet valve 46 also has a third port 53 that is connected to the blower inlet 42, port 53 being located in a central portion of the cylindrical housing 55 for the valve.

The blower outlet valve 47 in the control assembly that is a part of power unit 38 (FIG. 2) is similar in construction to inlet valve 46. Thus, valve 47 comprises a cylindrical housing 59 having first, second and third ports 61, 62 and 63. The first end port 61 of outlet valve 47 is connected to the vacuum conduit 37 of the conveyor system through filter 54. The second port 62, which is located at the opposite end of housing 59 from port 61, is connected to an exhaust conduit 64, conduit 64 being vented to the atmosphere through a muffler 65 and a suitable exhaust screen (not shown). The third port 63 for outlet valve 47 communicates with a central portion of valve housing 59 and is connected to the outlet 43 of blower 41. For small-capacity power units, the two exhaust conduits 56 and 64 may be interconnected, utilizing only a single muffler and exhaust screen, as shown in the schematic drawings comprising FIGS. 3–5.

Power unit 38 (FIG. 2) further comprises actuating means for selective actuation of the blower inlet and outlet valves 46 and 47. The actuating means includes a pneumatic control unit 67 connected to valve 46 by a pressure line 68 and connected to valve 47 by a similar pressure line 69. Some of the operating components for the actuating means comprising control unit 67 are shown in the schematic views afforded in FIGS. 3–5.

FIGS. 3 through 5 illustrate additional components of the blower control assembly as incorporated in one embodiment of the present invention. As shown in these figures, a fluid-pressure-actuated valve operator comprising a cylinder 71 is mounted within the housing 55 of the blower inlet valve 46. A piston 72 is positioned within cylinder 71 and is biased toward the right-hand end of the cylinder by a biasing spring 73. Piston 72 is mounted upon an operating rod 74 which extends axially of and projects outwardly of the opposite ends of cylinder 71 to afford two operating rod elements 75 and 76.

A first port closure member 77 is mounted on the outer end of the operating rod element 75 in alignment with the first port 51 of valve 46. The port closure member 77 is of conical configuration and is formed of relatively soft elastomer material; member 77 seats upon a sharp annular valve seat at the inner end of port 51. Closure member 77 may be of frusto-conical configuration, if desired, so long as the conical portion of the closure member engages the valve seat; the term "conical" as used in this specification and in the appended claims is intended to encompass the frusto-conical modification.

At the opposite end of the valve operator comprising cylinder 71, a second conical port closure member 78 is mounted on the end of rod 74 comprising rod element 76. Closure member 78 is aligned with and seats on a sharp annular valve seat at the inner end of the second port 52 of valve 46.

The fluid pressure line 68 (see FIG. 2) is connected to the right hand end of the valve operator cylinder 74, as shown in FIG. 3. Line 68 is connected, through an adjustable air pressure regulator 79, to a two-position solenoid-actuated control valve 81. In FIG. 3, valve 81 is shown in its actuated condition. A compressed air supply 82 is connected to control valve 81 and, with control valve 81 in the illustrated actuated condition, is connected to the valve operator cylinder 71 through regulator 79 and line 68. A vacuum guage 80 is connected to housing 55 of valve 46.

The blower outlet valve 47 is basically similar in construction to inlet valve 46. Valve 47 comprises a fluid-pressure-actuated valve operator, including a cylinder 91, that is mounted within the valve housing 59. A piston 92 is mounted in cylinder 91 and is biased toward the right-hand end of cylinder 91 by a spring 93. Piston 92 is mounted on a rod 94 that extends axially through cylinder 91 and projects outwardly of cylinder 91 to afford two operating rod elements 95 and 96.

A first port closure member 97 for the blower outlet valve 47 is mounted on the outer end of the operating rod element 95 in alignment with the first port 61 of valve 47. The port closure member 97 is of conical configuration and is preferably formed from a relatively soft elastomer material. Closure member 97 seats upon an annular valve seat of relatively sharp configuration at the inner edge of port 61. A second port closure member 98 is mounted on the outer end of the second operating rod element 96, in alignment with the second port 62 of the blower outlet valve 47. Closure member 98 may be of conical configuration, like closure members 77, 78 and 97; a conical construction is preferred for systems using blowers of relatively small capacity (e.g., 7.5 horsepower or less). In the illustrated construction, however, closure member 98 is made slightly smaller in diameter than port 62 so that port 62 is only partially closed when operating rod 94 is driven to the left from the position illustrated in FIG. 3, as described more fully hereinafter in connection with FIG. 4. The illustrated construction is preferred in systems using large-capacity blowers.

At the right-hand end of cylinder 91, in the valve operator for outlet valve 47, there is a connection to a fluid pressure line 69 (FIG. 3). Line 69 is connected to a solenoid-operated two-way control valve 101 shown, in FIG. 3, in its de-energized condition. For the illustrated operating condition, line 69 is vented to the atmosphere through control valve 101. When control valve 101 is actuated, however, line 69 is connected to the compressed air supply 82 by the control valve, as described more fully hereinafter.

FIGS. 3, 4, and 5 illustrate three distinctively different operating conditions for the blower control assembly for blower 41, these different operating conditions corresponding to three different modes of operation for the vacuum conveyor system in which the blower and its controls aren't utilized. These three modes of operation are:

A. A conveyor vacuum mode, in which blower 41 exhausts air from the vacuum conduit 37, shown in FIG. 3;

B. A conveyor pressure mode, shown in FIG. 4, in which blower 41 pumps air under pressure into conduit 37; and C. A conveyor idling mode, FIG. 5, in which blower 41 is cut off from conduit 37 at both its inlet and outlet; the inlet and the outlet of the blower are both connected to exhaust.

To establish the vacuum conveyor system in its vacuum mode of operation (FIG. 3), control valve 81 is actuated to connect the compressed air supply 82 to line 68, supplying air under pressure to the right-hand side of the valve operator cylinder 71. The air pressure in cylinder 71 drives piston 72 and rod 74 to the left, against the bias of spring 73, seating port closure member 78 against the sharp annular valve seat of port 52. The movement of rod 74 also pulls closure member 77 well clear of port 51, so that port 51 is open to the vacuum conveyor system conduit 37.

For vacuum mode operation (FIG. 3), the control valve 101 for blower outlet valve 74 is left de-energized so that line 69 is open to the atmosphere. Bias spring 93 drives piston 92 and rod 94 toward the right-hand end of the valve actuator cylinder 91. As a consequence, closure member 97 is seated in the annular valve seat formed at the interior of port 61, closing the connection between port 61 and the vacuum conveyor system conduit 37. At the same time, closure member 98 is maintained in a displaced position with respect to port 62. Thus, for the vacuum mode of operation of the conveyor system, FIG. 3, the blower inlet valve 46 has been actuated from its normal or first operating condition to its second or actuated condition, with port 51 connected to port 53 so that the inlet 42 of blower 41 is in communication with conveyor conduit 37. The blower outlet valve 47 remains in its normal or first operating condition, with port 62 in communication with port 63 so that blower outlet 43 is vented to the atmosphere through exhaust conduit 64, muffler 57A, and screen 58. Accordingly, air is exhausted from conveyor conduit 37 by blower 41, producing the requisite vacuum in conduit 37 to feed material into the vacuum hoppers 31–36 of system 10 (FIG. 1).

To change from the vacuum mode of operation shown in FIG. 3 to a pressure or blowback mode of operation, control valve 81 is de-energized and control valve 101 is actuated, producing the operating conditions illustrated in FIG. 4. With control valve 81 de-energized, the right-hand portion of the valve operator cylinder 71 in the blower inlet valve 46 is vented to the atmosphere through line 68, regulator 79, and valve 81. As a consequence, piston 72 is driven toward the right-hand end of cylinder 71 by spring 73, producing a corresponding movement of the operating rod 74. Accordingly, closure member 77 engages the annular seat at the interior of port 51 and closes port 51, cutting off communication of inlet valve 46 with the conveyor system conduit 37. At the same time, closure member 78 is pulled well clear of the second port 52 of inlet valve 46. Thus, port 52 is connected to port 53 so that inlet 42 of blower 41 is vented to the atmosphere through exhaust conduit 56.

With control valve 101 energized, as shown in FIG. 4, piston 92 is driven toward the left-hand end of valve operator cylinder 91 in the blower outlet valve 47, against the bias afforded by spring 93. The piston movement pulls operating rod 94 to the left and moves port closure member 97 to a position substantially displaced from the valve seat at the interior of port 61. The same movement of rod 94 shifts closure member 98 into port 62, at least partially closing port 62. If a full-size conical closure member is used as closure member 98, port 62 is completely blocked. In this manner, port 61 is effectively connected to port 63 so that blower outlet 43 is placed in communication with the conveyor system conduit 37.

For the pressure mode of operation illustrated in FIG. 4, blower 41 draws air from the atmosphere through exhaust conduit 56, valve ports 52 and 53, and blower inlet 42. This air is forced, under pressure, out of blower outlet 43 and through port 63 into the cylindrical housing 59 of outlet valve 47. Some of the air may escape through the partially closed port 62, but most of the air is forced, under pressure, out through port 61 and into the conveyor system conduit 37. Thus, an effective pressure or blowback mode of operation is obtained for the vacuum conveyor system connected to conduit 37, as described above in connection with FIG. 1. Of course, if port 62 is completely closed by a full-size conical port closure member substituted for the smaller member 98, the pressure afforded will be the total pressure that can be developed by blower 41. The smaller closure member 98 is usually utilized in systems incorporating blowers of relatively large capacity, permitting use of a blower having the capacity necessary for effective vacuum operation without producing a danger of excessive pressure during the pressure mode of operation of the system.

FIG. 5 illustrates the third or idling mode of operation for the blower control assembly of the present invention. The idling mode illustrated in FIG. 5 may be utilized for time intervals in which there is no need for either a vacuum or a substantial pressure in conveyor system conduit 37. Moreover, FIG. 5 illustrates the operating condition that obtains in the event of a failure of the compressed air supply 82 or a failure of the operating coils or electrical controls for control valves 81 and 101.

In the idling mode (FIG. 5), both of the control valves 81 and 101 are de-energized. As a consequence, the pistons in the valve operators for blower inlet valve 46 and blower outlet valve 47 are each driven toward the right-hand end of the associated operator cylinder by the related valve operator biasing spring. Accordingly, port 51 of valve 46 is closed by closure member 77 and port 61 of valve 47 is closed by closure member 97. With ports 51 and 61 thus closed, blower 41 is cut off completely from the conveyor system conduit 37. At the same time, both port 52 of valve 46 and port 62 of valve 47 are open. Accordingly, the inlet 42 and the outlet 43 of blower 41 are both connected to the atmosphere, through their exhaust conduits, so that overheating and consequent damage to blower 41 is precluded even though the blower may run for a substantial period of time in the idling mode. It is thus seen that the idling mode of operation for the blower control assembly affords a failsafe operation preventing substantial damage to the equipment regardless of failure of the compressed air supply or the electrical supply for control valves 81 and 101 or any failure of the solenoids of the control valves.

Pneumatic valve operators (cylinders 71 and 91) and related pneumatic controls have been illustrated and described for blower inlet and outlet valves 46 and 47. Hydraulic valve operators could be employed, but pneumatic devices are preferred to preclude contamination of the blower equipment in the event of any failure of the valve operator cylinders. Solenoid valve operators could also be utilized, but are considered overly expensive for many applications.

Regulation of the vacuum developed in the conveyor system is often desirable, particularly if blower 41 has excess capacity and vacuum mode operation may continue for extended intervals. Regulator 79 may be adjusted for a given vacuum level, to cut off the compressed air supply to valve operator cylinder 71 whenever an undesirably high vacuum is developed in inlet valve housing 55. Whenever regulator 79 operates to cut off the air pressure supply to the valve operator cylinder 71, piston 72 is driven to the right by spring 73 to advance closure member 77 toward the valve seat for port 51, so that an excessively low pressure condition is not developed in the conveyor system. Gauge 80 affords a convenient means for calibrating regulator 79.

Another regulation or pressure relief problem is presented in conjunction with the pressure or blowback mode of operation illustrated in FIG. 4. To prevent development of an excessive pressure condition in the conveyor system, conduit 37, spring 73 is selected for a given limited strength. Since spring 73 affords the only force holding closure member 77 seated in the valve seat at the inner end of port 51, valve 46 functions automatically as a pressure relief valve, opening port 51 whenever a given threshold pressure is developed in conduit 37 and preventing damage to the vacuum conveyor system.

In the blowback (pressure mode) of operation, particularly with powders and powder-like materials, that tend to cake on the conveyor system filters, excessive "dusting" may occur if operation in the pressure mode is sustained for substantial time intervals. Moreover, under these circumstances movement of excessive quantities of air may be required for the blowback function. These difficulties can be effectively avoided by pulsing valve 47, in the pressure mode, for short time intervals, which may be as short as a second or even less. By thus controlling the number of pressure pulses, the length of the pulses, and the intervals between pulses, effective filter cleaning can be accomplished without dusting or excessive air movement. For any given vacuum conveyor system and material, the timing and duration of the pulses is best determined on an empirical basis. An adjustable pulse timer can be readily incorporated in control unit 67 (FIG. 2) for pulse actuation of the control valve 101 for blower outlet valve 47.

Valves 46 and 47 are inherently self-cleaning and non-clogging in operation. Closure members 77, 78, and 97 (and 98 if a conical closure is used) tend to scrape off any foreign matter that lodges on the closure members or on the valve seats, each time the valves 46 and 47 are actuated. Even if some foreign material is not dislodged, the elastomer closure members afford an effective seal in virtually all instances.

I claim:

1. A blower control assembly for the blower of a vacuum conveyor system, providing both vacuum and pressure operation of the conveyor system without reversal of the blower, comprising:
   a blower inlet valve having first, second, and third ports respectively connected to the conveyor system, to an exhaust conduit, and to the blower inlet;
   a blower outlet valve having first, second, and third ports respectively connected to the conveyor system, to an exhaust conduit, and to the blower outlet;
   each of the blower inlet and outlet valves being actuatable between a first operating condition, in which the second valve port is connected to the third valve port with the first valve port closed, and a second operating condition in which the third valve port is connected to the first valve port with the second valve port closed;
   and actuating means, connected to the blower inlet and outlet valves, for selectively actuating the valves to establish the conveyor system in each of the following modes of operation:
   A. a conveyor vacuum mode, with the blower inlet valve in its second operating condition and the blower outlet valve in its first operating condition;
   B. a conveyor pressure mode, with the blower inlet valve in its first operating condition and the blower outlet valve in its second operating condition; and
   C. a conveyor idling mode, with each blower valve in its first operating condition.

2. A blower control assembly for a vacuum conveyor system, according to claim 1, in which each of the blower inlet and outlet valves includes biasing means for biasing the valve toward its first operating condition, so that the idling mode obtains in the event of failure of the actuating means.

3. A blower control assembly for a vacuum conveyor system, according to claim 2, in which the biasing means for the blower inlet valve exerts only a limited biasing force, so that the blower inlet valve functions as a pressure relief valve in the pressure mode of operation.

4. A blower control assembly for a vacuum conveyor system, according to claim 1, in which the actuating means includes pulse means for actuating the blower outlet valve between its second and first operating conditions in a series of short spaced pulses, in the pressure mode of operation, for effective blowback without excessive dusting or excessive air movement.

5. A blower control assembly for a vacuum conveyor system, according to claim 4, in which the pulse means includes means for adjusting the relative duration and frequency of the time intervals in which the blower outlet valve is held in its second operating condition.

6. A blower control assembly for a vacuum conveyor system, according to claim 1, in which the actuating means comprises a supply of fluid under pressure and in which each of the blower inlet and outlet valves comprises:
   a cylindrical valve housing having the first and second ports at opposite ends of the housing and the third port in the central portion of the housing;
   a fluid pressure actuated valve operator mounted in the valve housing and having first and second valve operating rod elements projecting toward the first and second ports, respectively;
   and first and second port closure members, mounted on the first and second valve operating rod elements and aligned with the first and second ports, respectively.

7. A blower control assembly for a vacuum conveyor system, according to claim 6, in which each valve operator comprises a sealed cylinder, in which the operating rod elements for each valve operator comprise a single unitary operating rod extending axially through the valve operator cylinder and projecting outwardly of the ends thereof, and in which each valve operator includes a piston mounted on the operating rod within the valve operator cylinder.

8. A blower control assembly for a vacuum conveyor system, according to claim 7, in which each valve operator includes a biasing spring biasing the piston toward the end of the valve operator cylinder through which the first operating rod element extends, so that each valve is normally maintained in its first operating condition and the idling mode obtains in the event of failure of the fluid pressure supply for the actuating means.

9. A blower control assembly for a vacuum conveyor system, according to claim 7, in which each port closure member of the inlet blower valve is of conical configuration, formed of relatively soft elastomer material, and seats on a sharp annular valve seat at the inner end of the port with which the closure member is aligned.

10. A blower control assembly for a vacuum conveyor system, according to claim 9, in which each port closure member of the outlet blower valve is of conical configuration, formed of relatively soft elastomer material, and seats on a sharp annular valve seat at the inner end of the port with which the closure member is aligned.

11. A blower control assembly for a vacuum conveyor system, according to claim 9, in which the first port closure member of the outlet blower valve is of conical configuration, formed of relatively soft elastomer material, and seats on a sharp annular valve seat at the inner end of the first port, and in which the second port closure member is slightly smaller in diameter than the second port of the outlet blower valve and projects into the second port to close the second port only partially when the outlet blower valve is in its second operating condition.

12. A blower control assembly for a vacuum conveyor system, according to claim 6, in which a pressure release means is connected to the blower inlet valve to release the blower inlet valve to return toward its first operating condition whenever the pressure in the inlet valve housing falls below a given threshold level.

* * * * *